US010212414B2

(12) United States Patent
Juenger

(10) Patent No.: US 10,212,414 B2
(45) Date of Patent: Feb. 19, 2019

(54) DYNAMIC REALIGNMENT OF STEREOSCOPIC DIGITAL CONSENT

(71) Applicant: Microsoft Technology Licensing, LLC, Redmond, WA (US)

(72) Inventor: Andrew Kilgour Juenger, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 15/225,726

(22) Filed: Aug. 1, 2016

(65) Prior Publication Data
US 2018/0035102 A1 Feb. 1, 2018

(51) Int. Cl.
*H04N 13/327* (2018.01)
*H04N 13/344* (2018.01)
*H04N 13/398* (2018.01)
*H04N 13/128* (2018.01)
*G06T 19/00* (2011.01)
*G06T 19/20* (2011.01)

(52) U.S. Cl.
CPC ......... *H04N 13/327* (2018.05); *G06T 19/006* (2013.01); *G06T 19/20* (2013.01); *H04N 13/128* (2018.05); *H04N 13/344* (2018.05); *H04N 13/398* (2018.05); *H04N 2213/002* (2013.01)

(58) Field of Classification Search
CPC ........... H04N 13/0022; H04N 13/0425; H04N 13/044; H04N 13/0497; H04N 13/0025; H04N 2213/002; G06T 19/006; G06T 19/20
See application file for complete search history.

(56) References Cited

U.S. PATENT DOCUMENTS

| | | | |
|---|---|---|---|
| 6,659,611 B2 | 12/2003 | Amir et al. |
| 7,002,551 B2 | 2/2006 | Azuma et al. |
| 7,511,684 B2 | 3/2009 | Oliver et al. |
| 7,538,876 B2 | 5/2009 | Hewitt et al. |
| 8,890,773 B1 | 11/2014 | Pederson |
| 9,259,147 B2 | 2/2016 | Baranton et al. |

(Continued)

OTHER PUBLICATIONS

"International Search Report and Written Opinion Issued in PCT Application No. PCT/US2017/043570", dated Oct. 13, 2017, 11 Pages.

(Continued)

*Primary Examiner* — Anner N Holder
(74) *Attorney, Agent, or Firm* — Rainier Patents, P.S.

(57) ABSTRACT

Techniques and apparatuses for dynamic realignment of stereoscopic digital content is described herein. A computing device causes display of stereoscopic digital content, which includes one or more left images rendered for a left eye of a viewer and one or more right images rendered for a right eye of the viewer. An alignment pattern is generated within the stereoscopic digital content such that the alignment pattern is within the field of view of the viewer. The alignment pattern is designed to exploit the human vision system in order to avoid detection of the alignment pattern by the viewer. One or more cameras are controlled to detect the alignment pattern in the digital content. Then, the digital content is realigned by adjusting at least one of the left or right images of the digital content based on the detected alignment patterns.

20 Claims, 7 Drawing Sheets

(56) References Cited

U.S. PATENT DOCUMENTS

| | | |
|---|---|---|
| 9,304,319 B2 | 4/2016 | Bar-Zeev et al. |
| 9,329,387 B2 | 5/2016 | Border et al. |
| 2011/0018903 A1 | 1/2011 | Lapstun et al. |
| 2013/0187943 A1* | 7/2013 | Bohn .................. H04N 13/0425 |
| | | 13/425 |
| 2013/0201403 A1 | 8/2013 | Iversen |
| 2014/0055447 A1 | 2/2014 | Wong et al. |
| 2014/0168264 A1 | 6/2014 | Harrison et al. |
| 2014/0292817 A1* | 10/2014 | Iversen .................. G03B 17/54 |
| | | 345/672 |
| 2015/0193983 A1 | 7/2015 | Katz et al. |
| 2015/0215611 A1 | 7/2015 | Wu et al. |
| 2016/0007016 A1 | 1/2016 | Holliman et al. |
| 2016/0012643 A1 | 1/2016 | Kezele et al. |

OTHER PUBLICATIONS

Knight, "Binocular Self-Alignment and Calibration from Planar", In Proceedings of the 6th European Conference on Computer Vision, Part II, Jun. 26, 2000, 15 pages.

\* cited by examiner

DYNAMIC REALIGNMENT OF STEREOSCOPIC DIGITAL CONSENT

BACKGROUND

Virtual reality and augmented reality systems and devices enable a user to immerse him or herself into the physical environment when wearing a head-mounted display unit that displays virtual and/or augmented reality user experiences. In augmented reality systems, the head-mounted display device can be implemented with a transparent or semi-transparent display through which a user of a device can view the surrounding environment. Further, augmented reality provides that a viewer can see through the transparent or semi-transparent display of a device to view the surrounding environment, and also see images of virtual objects that are generated for display to appear as an enhancement of the physical environment.

In order to provide virtual images to a viewer, a stereoscopic display system may be utilized. A stereoscopic three-dimensional display is configured to present different images to the left and right eyes of a viewer. The images are differentiated to simulate the parallax that would naturally occur between two eyes of a viewer if actually present at the object location. Thus, the viewer's brain can process the differentiated images normally to provide depth perception to the viewer. In stereoscopic image presentation, alignment of the left and right images is critical for visual comfort and control of stereoscopic depth sensation.

However, while the viewer is utilizing the device, various environmental events can disrupt the alignment of a stereoscopic images, such as impacts to the device or thermal expansion. When the stereoscopic images become misaligned, the viewer may experience visual fatigue and discomfort.

SUMMARY

Techniques and apparatuses for dynamic realignment of stereoscopic digital content is described herein. In one or more implementations, a computing device (e.g., a head-mounted display device) causes display of stereoscopic digital content, which includes one or more left images rendered for a left eye of a viewer and one or more right images rendered for a right eye of the viewer. An alignment pattern is generated within the stereoscopic digital content such that the alignment pattern is within the field of view of the viewer. However, the alignment pattern is designed to exploit the human vision system in order to avoid detection of the alignment pattern by the viewer, such as by configuring the alignment pattern with isoluminant colors, a high spatial frequency, or angled markings (e.g., markings offset from 0 and 90 degrees). In one or more implementations, alignment patterns of opposite polarity are interleaved within the digital content such that the viewer temporally fuses the oscillations between the alignment patterns into a constant level and thus is unable to see the alignment patterns. The computing device includes one or more cameras that are configured to detect the alignment pattern in the one or more left images and the one or more right images of the stereoscopic digital content. Then, the digital content is realigned by adjusting at least one of the left or right images of the stereoscopic digital content based on the detected alignment patterns.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Techniques and apparatuses for dynamic realignment of stereoscopic digital content is described herein. In one or more implementations, a computing device (e.g., a head-mounted display device) causes display of stereoscopic digital content, which includes one or more left images rendered for a left eye of a viewer and one or more right images rendered for a right eye of the viewer.

Various environmental factors may cause the left and right images of the stereoscopic digital content to become misaligned while the viewer is using the computing device. Thus, an alignment pattern that is configured to enable automatic realignment of the stereoscopic digital content may be generated within the stereoscopic digital content such that the alignment pattern is within the field of view of the viewer. Generating the alignment pattern within the field of view of the viewer reduces the need to utilize additional display pixels (e.g., which are outside the field-of-view of the viewer) for the sole purpose of displaying the alignment pattern.

In accordance with various implementations, the alignment pattern is designed to exploit key aspects of the human vision system in order to avoid detection of the alignment pattern by the viewer, while still being detectable by one or more cameras of the computing device. The alignment pattern may be designed in a variety of different ways in order to avoid detection by the viewer, such as by configuring the alignment pattern with isoluminant colors, a high spatial frequency, or angled markings (e.g., markings offset from 0 and 90 degrees), to name just a few. Alternately or additionally, alignment patterns of opposite polarity may be interleaved within the digital content such that the viewer temporally fuses the oscillations between the alignment patterns into a constant level and thus is unable to see the alignment patterns.

The computing device includes one or more cameras that are configured to detect the alignment pattern in the one or more left images and the one or more right images of the stereoscopic digital content. Then, the digital content is realigned by adjusting at least one of the left and right images of the stereoscopic digital content based on the detected alignment patterns.

Example Environment

Figure 1:
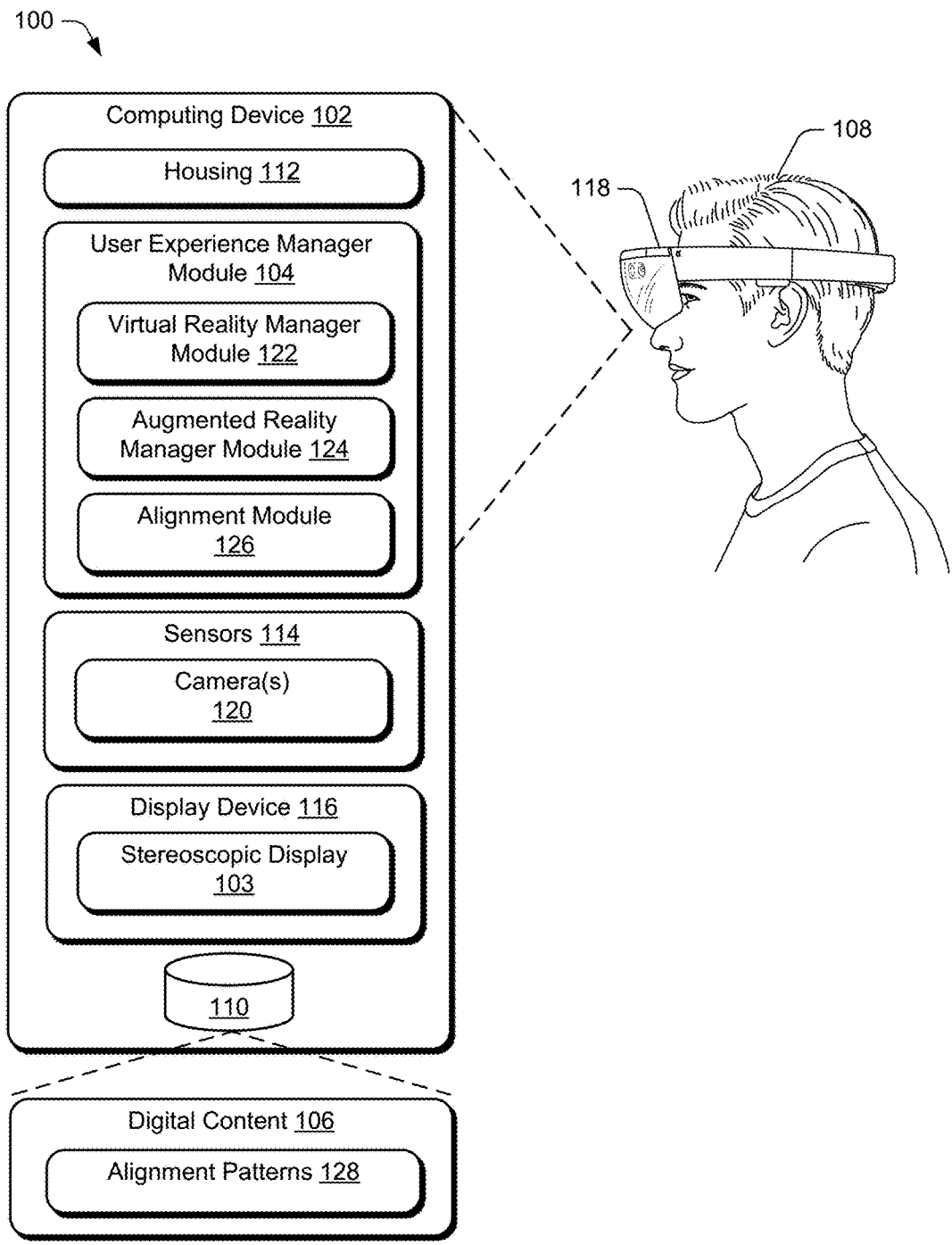
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 configured for use in augmented reality and/or virtual reality scenarios, which may be configured in a variety of ways.

Figure 7:
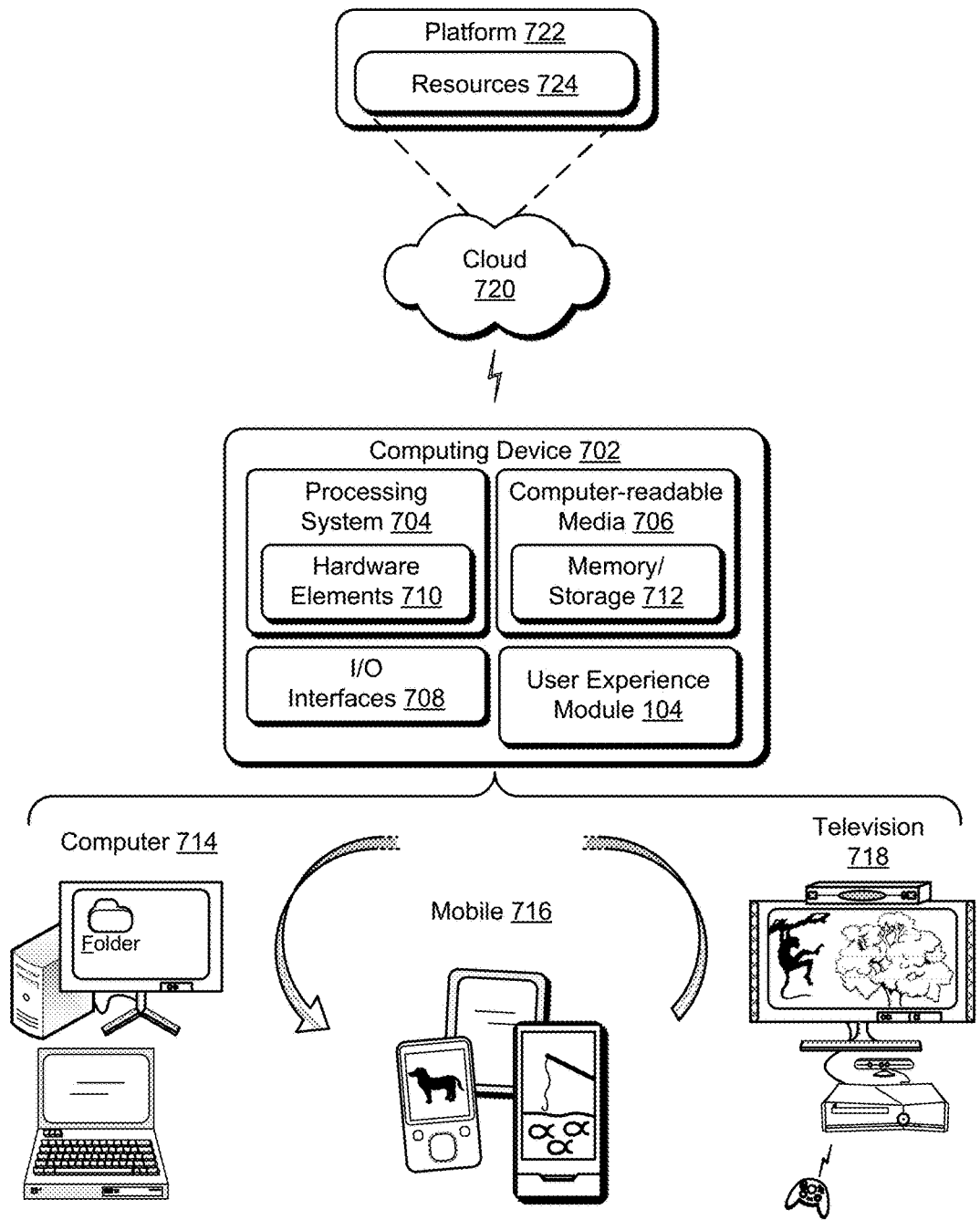
FIG. 7 illustrates an example system having devices and components that may be employed to implement aspects of the techniques described herein.

The computing device 102 is illustrated as including a user experience manager module 104 that is implemented at least partially in hardware of the computing device 102, e.g., a processing system and memory of the computing device as further described in relation to FIG. 7. The user experience manager module 104 is configured to manage output of and user interaction with digital content 106. Examples of such digital content 106 include immersive digital content such as 360-degree images, virtual objects displayed as part of a virtual or augmented reality scenario, stereoscopic digital content, and so forth that are made visible to a viewer 108. The digital content 106 is illustrated as maintained in storage 110 of the computing device 102 but may be maintained elsewhere, such as "in the cloud" as also described in relation to FIG. 7.

The computing device 102 includes a housing 112, one or more sensors 114, and a display device 116. The housing 112 is configurable in a variety of ways to support interaction with digital content 106. In one example, the housing 112 is configured to be worn on the head of a viewer 108 (e.g., as a head-mounted display device 118), such as through configuration as goggles, glasses, contact lens, and so forth. Other configurations are also contemplated, such as configurations in which the computing device 102 is disposed in a physical environment apart from the viewer 108, e.g., as a "smart mirror," wall-mounted projector, television, and so on.

The sensors 114 may also be configured in a variety of ways to detect a variety of different conditions. In one example, the sensors 114 are configured to detect an orientation of the computing device 102 in three dimensional space, such as through use of accelerometers, magnetometers, inertial devices, radar devices, and so forth. In another example, the sensors 114 are configured to detect environmental conditions of a physical environment in which the computing device 102 is disposed, such as objects, distances to the objects, motion, colors, and so forth.

In this example, sensors 114 are illustrated as including one or more cameras 120. In one or more implementations, the cameras 120 include at least a first camera mounted on a first side (e.g., the left side) of the housing 112 of computing device 102 that is configured to detect an alignment pattern in a left image of the digital content 106, and a second camera mounted on a second side (e.g., a right side) of the housing 112 of computing device 102 that is configured to detect an alignment pattern in a right image of the digital content 106.

The display device 116 is configurable in a variety of ways to support rendering of the digital content 106. Examples of which include a typical display device found on a mobile device such as a camera or tablet computer, a light field display for use on a head-mounted display in which a viewer may see through portions of the display (e.g., as part of an augmented reality scenario), projectors, and so forth. Other hardware components may also be included as part of the computing device 102, including devices configured to provide user feedback such as haptic responses, sounds, physical input devices, and so forth.

In one or more implementations, display device 116 is implemented as a stereoscopic display 103 that can provide three-dimensional (3D) content to viewers, such as images (e.g., stereoscopic imagery) and/or video effective to cause a viewer to be able to perceive depth within the content when displayed. The stereoscopic display 103 may be implemented in a variety of different ways, such as a liquid crystal display on a silicon panel or a micro O-LED. Generally, the stereoscopic display 103 enables display of different stereoscopic imagery to each eye of the viewer 108. For example, digital content may be rendered for the viewer that includes a left image rendered for the viewer's left eye and a right image rendered for the viewer's right eye.

The housing 112, sensors 114, and display device 116 are also configurable to support different types of virtual user experiences by the user experience manager module 104. In one example, a virtual reality manager module 122 is employed to support virtual reality. In virtual reality, a viewer is exposed to an environment, the viewable portions of which are entirely generated by the computing device 102. In other words, everything that is seen by the viewer 108 is rendered and displayed by the display device 116 through use of the virtual reality manager module 122. The viewer, for instance, may be exposed to virtual objects as part of the digital content 106 that are not "really there" and are displayed for viewing by the viewer in an environment that also is completely computer generated.

The user experience manager module 104 is also illustrated as supporting an augmented reality manager module 124. In augmented reality, the virtual objects of the digital content 106 are used to augment a direct view of a physical environment of the viewer 108. The viewer 108, for instance, may view the actual physical environment through head-mounted display device 118. The head-mounted display device 118 do not recreate portions of the physical environment as virtual representations as in the virtual reality scenario above, but rather permit the viewer 108 to directly view the physical environment without recreating the environment. The digital content 106 is then displayed by the display device 116 to appear as disposed within this physical environment. Thus, in augmented reality the digital content 106 acts to augment what is "actually seen" by the viewer 108 in the physical environment.

The user experience manager module 104 is also illustrated as including an alignment module 126 that is configured to perform a "binocular alignment" of the digital content 106. When display device 116 is implemented as stereoscopic display 103, the alignment module 126 is configured to detect that the left and right images of the digital content 106 are misaligned. In response, the alignment module adjusts at least one of the left or right images of the digital content 106 in order to realign the digital content 106. Alternately, to realign the digital content 106, the alignment module 126 can guide a physical realignment of display device 116.

In order to provide the realignment, the alignment module 126 is configured to generate alignment patterns 128 within the digital content 106 such that the alignment patterns 128 are within the field of view of the viewer 108. However, the alignment patterns 128 are configured such that they are detectable by the one or more cameras 120 of computing device 102, but are not detectable by the human vision system. Thus, even though the alignment patterns 128 are generated within the field of view of the viewer 108, the viewer is unable to detect the alignment patterns 128 and thus does not notice the realignment procedure. Further, because the alignment patterns 128 are embedded within the digital content 106, the alignment patterns do not need to use extra pixels that are outside of the field of view of the viewer, thereby reducing the size and cost of the display device 116.

Figure 2:
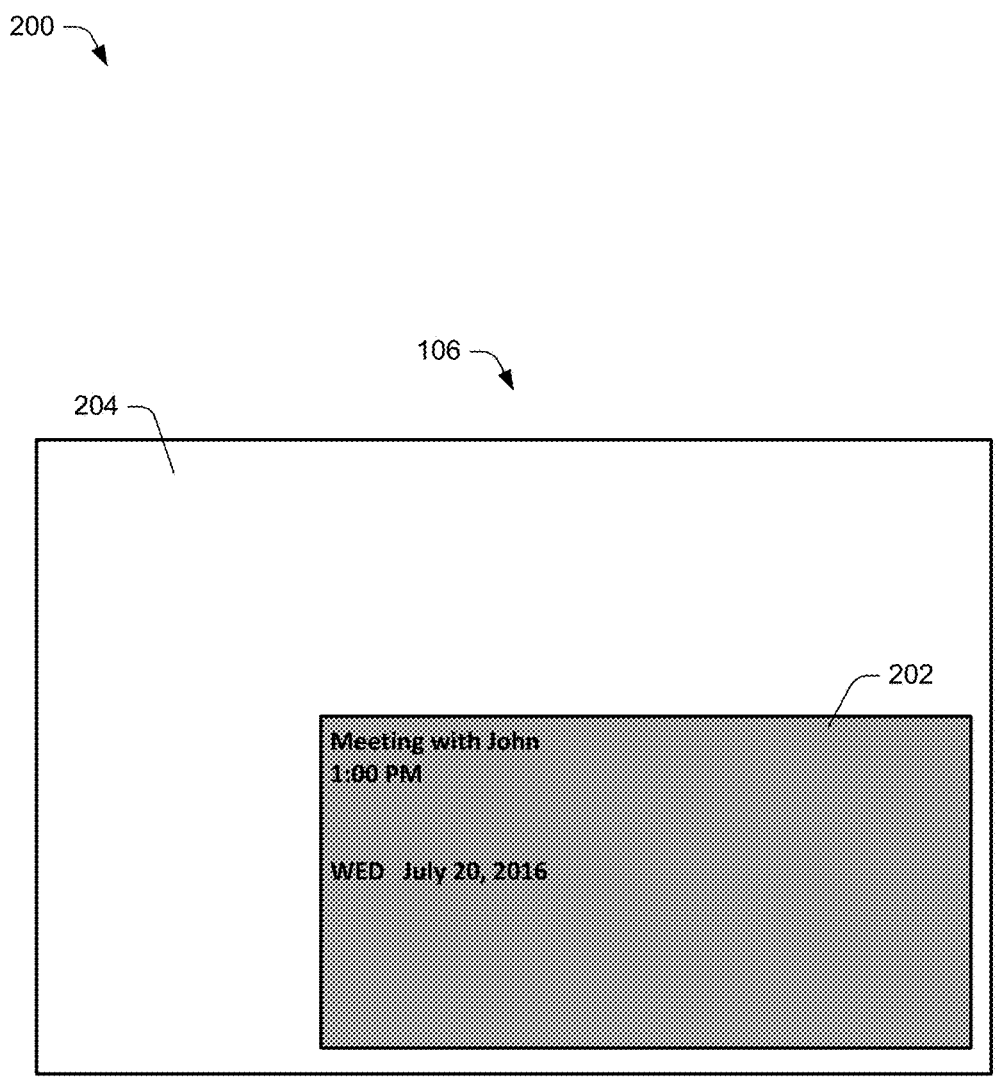
FIG. 2 illustrates an example of digital content that can be rendered for viewing in an augmented reality or virtual reality environment.

FIG. 2 illustrates an example 200 of digital content that can be rendered for viewing in an augmented reality or virtual reality environment. In this example, the digital content 106 includes a calendar tile 202 sitting in an otherwise empty field 204 of the digital content 106. In this example, the calendar tile 202 indicates that a "Meeting with John" is scheduled for 1:00 PM on Wednesday July 30th. Notably, the empty field 204 of the digital content 106 is transparent, such that when the digital content 106 is rendered for viewing in a real-world environment, the viewer is able to see the calendar tile 202 and can "see through" the empty field 204 to see real the physical "real world" environment behind the digital content 106.

Figure 3:
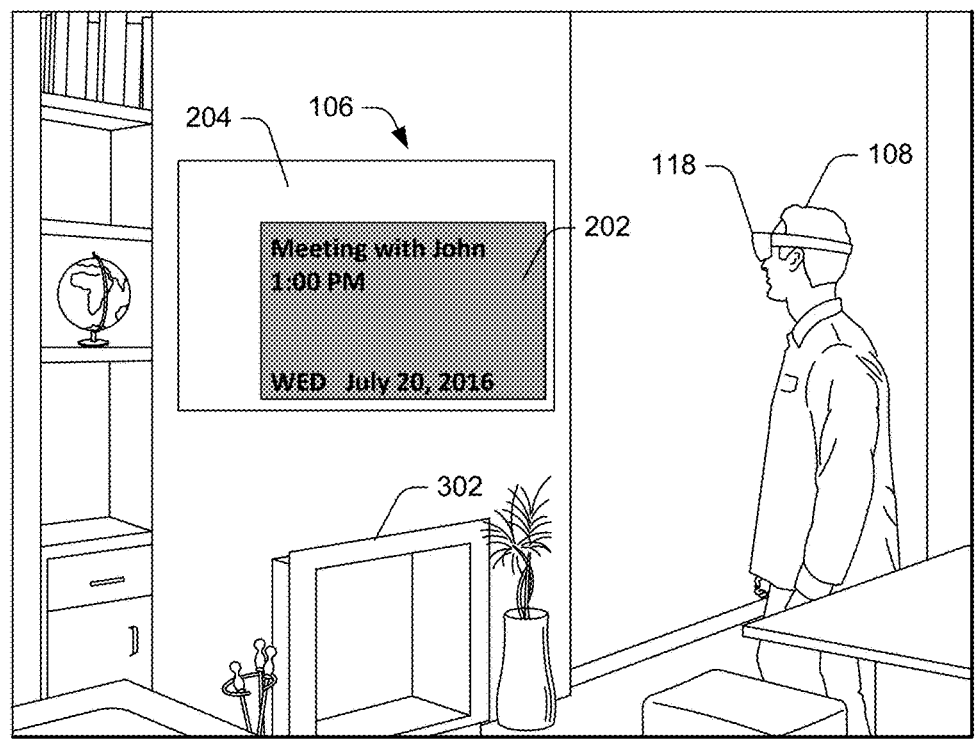
FIG. 3 illustrates an example of an augmented reality environment in which the digital content of FIG. 2 is rendered for viewing.

As an example, consider FIG. 3 which illustrates an example of an augmented reality environment 300 in which the digital content 106 of FIG. 2 is rendered for viewing. In this example, viewer 108 is wearing computing device 102 implemented as a head-mounted display device 118 in order to immerse himself in augmented reality environment 300. The head-mounted display device 118 causes display of the digital content 106 from FIG. 2, which includes calendar tile 202 and empty field 204 (rendered as a virtual image or hologram). While wearing the head-mounted display device 118, the viewer is still able to see physical objects in the environment, such as fireplace 302.

As discussed above, digital content 106 may be rendered as stereoscopic images by display device 116, such that different digital images are rendered for each of the viewer's left and right eyes. However, as the viewer moves their head, or moves around the room, the alignment of the left and right digital images of digital content 106 may become misaligned.

Thus, in accordance with various implementations, alignment module 126 is configured to re-align the left and right images of the digital content 106 automatically, which is often referred to as a "binocular adjustment". In order to perform the realignment, alignment module 126 causes alignment patterns 128 to be generated within the digital content 106. In some cases, the alignment module 126 may generate the alignment patterns 128 at periodic time intervals, such as when the computing device 102 is powered on, and every 30 seconds thereafter. Alternately, alignment module 126 may be configured to detect conditions which may be indicative of misalignment, such as a sudden movement by the viewer 108, and thus perform the alignment in response to this detection.

After the alignment patterns 128 are generated, the cameras 120 are controlled to detect the alignment patterns 128 in each of the left and right images of the digital content 106. The location and position of the alignment patterns 128 may then be used to automatically realign the left and right images of the digital content 106, as will be discussed in more detail below.

Generally, alignment pattern 128 is designed with various markings or patterns which can be used by the alignment module 126 to determine an offset of the left or right images of the digital content. In accordance with various implementations, these markings or patterns of alignment pattern 128 are designed in such a way as to exploit key aspects of the human vision system in order to cause the alignment pattern 128 to be difficult to detect by the viewer 108, while still being detectable by one or more cameras 120 of the computing device 102. The alignment pattern may be designed in a variety of different ways in order to avoid detection by the viewer, such as by configuring the alignment pattern with isoluminant colors, a high spatial frequency, or angled markings (e.g., markings offset from 0 and 90 degrees), to name just a few. In one or more implementations, alignment patterns 128 of opposite polarity are interleaved within the digital content 106.

Figure 4:
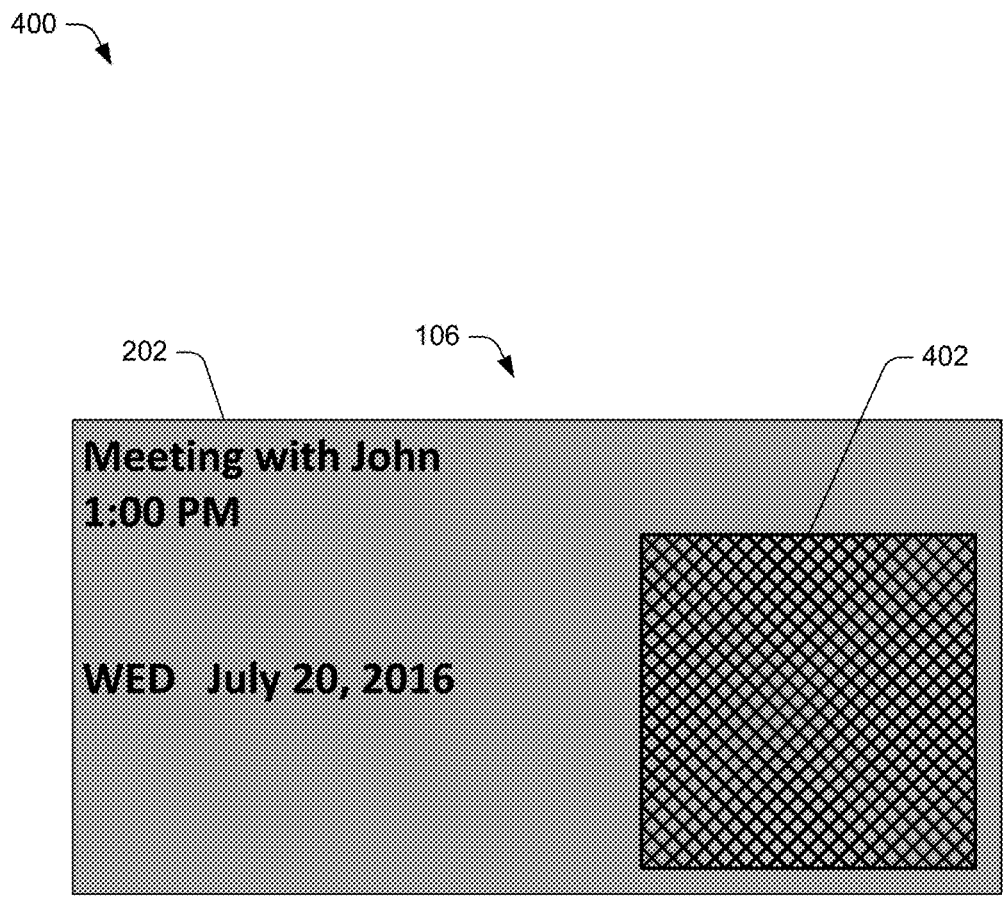
FIG. 4 illustrates an example of an alignment pattern that is generated within digital content.

As an example, consider FIG. 4 which illustrates an example 400 of an alignment pattern 400 that is generated within digital content 106.

In this example, an alignment pattern 402 is generated or embedded within the calendar tile 202 of digital content 106, and includes an "egg crate" pattern. It is to be noted, however, that alignment pattern 128 may be generated in a variety of different ways, using different types of markings, lines, shapes, and so forth. While alignment pattern 128 is illustrated as being viewable in this example, there are various ways in which this alignment pattern may be modified to avoid detection by the viewer 108.

For instance, alignment module 126 may generate alignment pattern 128 using isoluminant colors. As described herein, isoluminant colors corresponds to colors of a similar luminance, such as blue and yellow modulation. Notably, the human vision system has reduced amplitude sensitivity to isoluminant colors. Thus, in one or more implementations, the alignment pattern 128 and the background of the digital content 106 on which the alignment pattern 128 is rendered correspond to isoluminant colors. In FIG. 4, for example, alignment pattern 402 may be rendered using isoluminant colors by causing the lines of alignment pattern 402 to be yellow if the gray content of the digital content 106 is blue. Doing so would cause the human vision system to have a difficult time detecting the yellow lines of the alignment pattern 128 on the blue background of the digital content 106.

Alternately or additionally, alignment module 126 may generate alignment patterns with a high spatial frequency. The human vision system has reduced frequency sensitivity to patterns or markings with a high spatial frequency, particularly where the patterns correspond to isoluminant colors. Returning to the example in FIG. 4, note that the alignment pattern 402 includes 31 "lines" in each of the intersecting directions. Thus, in order to increase the spatial frequency of the alignment pattern 402, the number of lines could be increased in each direction. For example, instead of just 31 lines in each direction, the alignment pattern 402 could include 61 lines in each direction. Doing so would cause alignment pattern 402 to be less visible to the human vision system.

Alternately or additionally, alignment module 126 may generate alignment patterns 128 with angled markings. The human vision system has reduced sensitivity to modulation aligned away from 0 degrees and 90 degrees, such as at a 45 degree alignment. In FIG. 4, for example, note that the lines of alignment pattern 402 are angled at 45 degrees, which makes this pattern more difficult to detect to the human vision system than if the markings were angled at 0 and 90 degrees (e.g., perpendicular vertical and horizontal lines).

Figure 5:
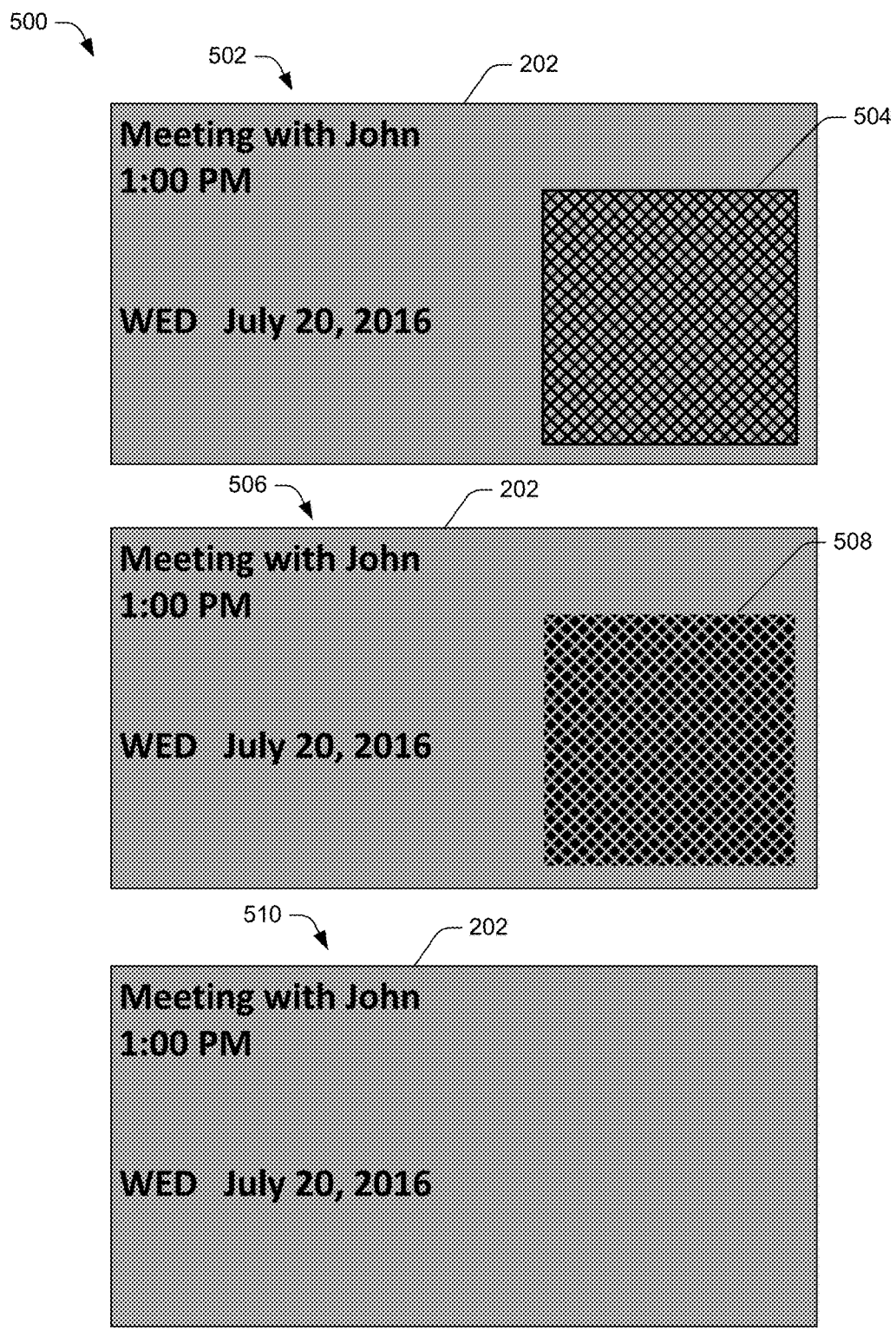
FIG. 5 illustrates an example of interleaving alignment patterns of opposite polarity to cause the alignment pattern to be difficult to detect by a viewer.

In one or more implementations, alignment module 126 interleaves alignment patterns 128 of opposite polarity, such that the viewer 108 temporally fuses the oscillations between the alignment patterns 128 into a constant level and thus is unable to see the alignment patterns 128. Consider, for example, FIG. 5 which illustrates an example 500 of spatial interleaving alignment patterns of opposite polarity to cause the alignment pattern to be difficult to detect by the viewer. In example 500, at 502, a first alignment pattern 504 is rendered within digital content 106, which in this case corresponds to the example digital content described in FIGS. 2 and 3. At 506, a second alignment pattern 508 is rendered within digital content 106. Notably, the first alignment pattern 504 and second alignment pattern 508 have opposite polarity, such that the light parts of alignment pattern 504 are dark in corresponding alignment pattern 508, and the dark parts of alignment pattern 504 are light in corresponding alignment pattern 508.

Alignment module 126 is configured to control the display of first alignment pattern 504 and second alignment pattern 508 to be alternately displayed at a sufficiently high temporal frequency such that the human vision system integrates the complementary patterns into the mean value so that the pattern that the viewer sees is the still image shown at 510, in which the alignment pattern is not visible in the digital content 106. For example, the alignment patterns of opposite polarity may be displayed in sequence at a frequency of 30 cycles per second or higher.

In one or more implementations, alignment module 126 can utilize various combinations of the characteristics discussed above in order to make the alignment patterns difficult to detect by the viewer. For example, the alignment module 126 may interleave alignment patterns of opposite polarity in which the alignment pattern uses isoluminant colors, has a high spatial frequency, and angled markings. The more of these characteristics that are used increases the difficulty of detection by the viewer.

As discussed throughout, while the alignment patterns are configured to avoid detection by the viewer, these characteristics are easily detectable by the cameras 120. For example, cameras 120 have no trouble detecting interleaved alignment patterns of opposite polarity in which the alignment pattern uses isoluminant colors, have a high spatial frequency, and angled markings.

Thus, after the alignment patterns 128 are generated, alignment module 126 controls cameras 120 to detect alignment patterns 128 in each of the left and right images of the digital content. For example, a first camera mounted on a left side of the housing 112 of computing device 102 can detect alignment patterns 128 in the left image of the digital content 106 rendered for the viewer's left eye, and a second camera mounted on a right side of the housing 112 can detect alignment patterns 128 in the right image of the digital content 106 rendered for the viewer's right eye. Alternately, rather than utilizing two cameras to detect the alignment patterns 128, a single camera 120 may utilize a prism in order to view the left and right images at the same time.

Alignment module 126 knows the position of the alignment patterns 128 within the digital content 106, and thus alignment module 126 can use the detected alignment patterns to calculate an amount of offset of the alignment pattern 128 in both of the left and right images of the digital content 106. Then, alignment module 126 uses the offset to adjust at least one of the left or right images of the digital content to perform the realignment.

Alignment module 126 can perform the realignment in a variety of different ways. In one or more implementations, alignment module 126 performs an image analysis of the detected alignment patterns in the left and right images to determine a difference (e.g., a phase difference) between the left and right images of the digital content 106. The image analysis, for example, may include a harmonic analysis (e.g., a Fourier analysis or Square wave analysis) or a spatial analysis (e.g., autocorrelation or pattern matching). Then, alignment module 126 realigns the digital content 106 by performing a correction, based on the difference, to bring the left and right images of the digital content 106 back into alignment.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
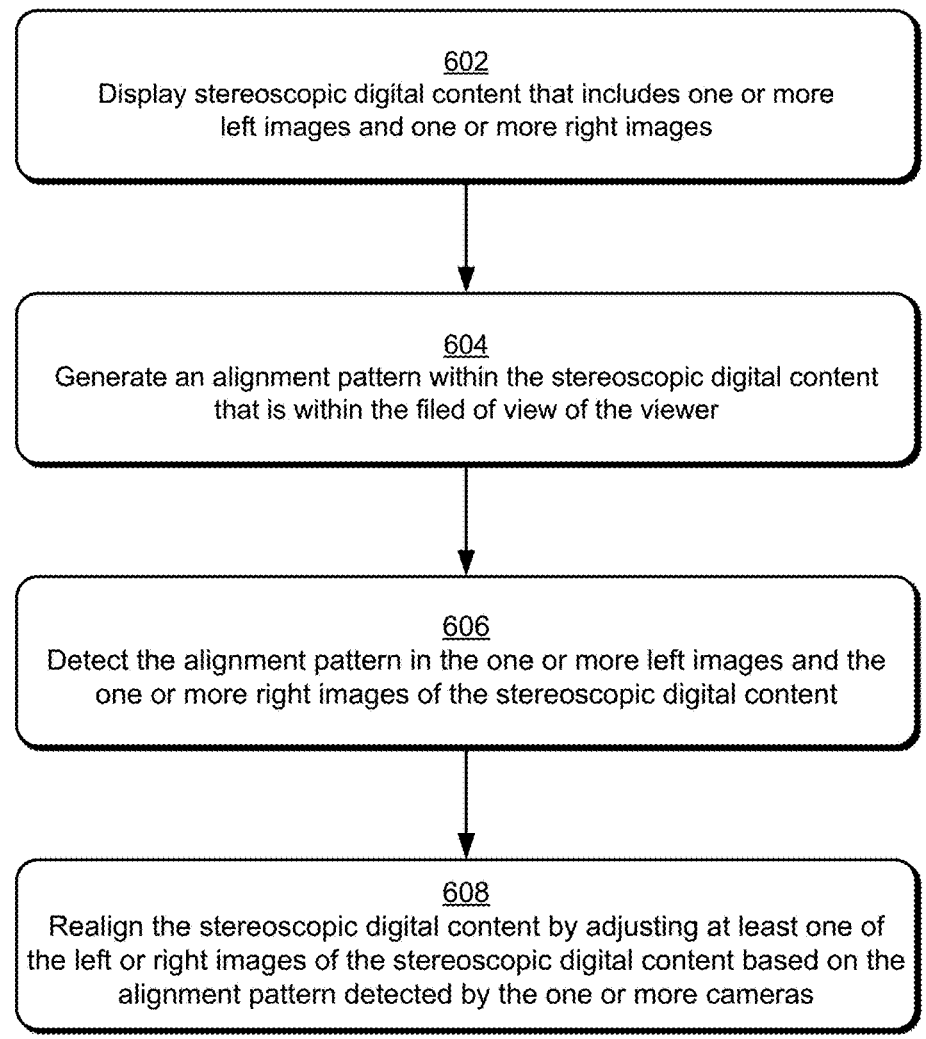
FIG. 6 depicts a procedure in an example implementation of dynamic realignment of stereoscopic digital content.

FIG. 6 depicts a procedure 600 in an example implementation of dynamic realignment of stereoscopic digital content.

At 602, display stereoscopic digital content that includes one or more left images and one or more right images is displayed. For example, display device 116 of computing device 102 causes display of digital content 106, which includes one or more left images for a left eye of a viewer 108, and one or more right images for a right eye of the viewer 108.

At 604, an alignment pattern is generated within the stereoscopic digital content such that the alignment pattern is within the field of view of the viewer. For example, alignment module 126 generates or embeds alignment patterns 128 into the digital content 106 such that the alignment pattern is within the field of view of the viewer 108. Even though the alignment pattern 128 is generated within the field of view of the viewer, the marking or patterns of the alignment pattern 128 are configured to exploit the human vision system in order to avoid detection by the viewer.

At 606, the alignment pattern is detected in the one or more left images and the one or more right images of the stereoscopic digital content by one or more cameras of the computing device. For example, one or more cameras 120 of computing device 102 detect the alignment patterns 128 in the left and right images of the digital content 106.

At 608, the stereoscopic digital content is realigned by adjusting at least one of the left and right images of the stereoscopic digital content based on the detected alignment patterns. For example, alignment module 126 adjusts at least one of the left and right images of the digital content 106 in order to align the images.

Example System and Device

FIG. 7 illustrates an example system generally at 700 that includes an example computing device 702 that is representative of one or more computing systems and/or devices that may implement the various techniques described herein. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including user experience manager module 104 and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the user experience manager module 104 on the computing device 702. The functionality of the user experience manager module 104 and other modules may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION AND EXAMPLE IMPLEMENTATIONS

Example implementations described herein include, but are not limited to, one or any combinations of one or more of the following examples:

A computing device comprising: a stereoscopic display configured to cause display of stereoscopic digital content, the stereoscopic digital content including one or more left images for a left eye of a viewer and one or more right images for a right eye of the viewer; at least a memory and a processor to implement an alignment module configured to generate an alignment pattern within the stereoscopic digital content that is difficult to detect by the viewer; one or more cameras configured to detect the alignment pattern in the one or more left images and the one or more right images of the stereoscopic digital content; and the alignment module configured to realign the stereoscopic digital content by adjusting at least one of the left and right images of the stereoscopic digital content based on the alignment pattern detected by the one or more cameras.

The computing device as described above, wherein the alignment pattern is generated within the digital content such that the alignment pattern is within a field of view of the viewer.

The computing device as described above, wherein the alignment pattern is configured to be detectable by the one or more cameras.

The computing device as described above, wherein the alignment pattern exploits one or more characteristics of a human vision system in order to avoid detection by the viewer.

The computing device as described above, wherein the alignment module is configured to interleave alignment patterns of opposite polarity within the digital content to cause the alignment pattern to be difficult to detect by the viewer.

The computing device as described above, wherein the alignment module is configured to generate the alignment pattern using isoluminant colors to cause the alignment pattern to be difficult to detect by the viewer.

The computing device as described above, wherein the alignment module is configured to generate the alignment pattern with a high spatial frequency to cause the alignment pattern to be difficult to detect by the viewer.

The computing device as described above, wherein the alignment module is configured to generate the alignment pattern with angled markings to cause the alignment pattern to be difficult to detect by the viewer.

The computing device as described above, wherein the alignment module is configured to realign the stereoscopic digital content by: performing an iamge analysis of the one or more left and right images of the stereoscopic digital content to determine a phase difference between the one or more left and right images; and realigning the stereoscopic digital content by performing a correction, based on the phase difference, to bring the left and right images of the stereoscopic digital content back into alignment.

The computing device as described above, wherein the one or more cameras include at least a first camera mounted on a left side of a housing of the computing device that is configured to capture the alignment pattern in the one or more left images of the stereoscopic digital content, and a second camera mounted on right side of the housing of the computing device that is configured to capture the alignment pattern in the one or more right images of the stereoscopic digital content.

The computing device as described above, wherein the computing device comprises a head-mounted display device.

The computing device as described above, wherein the stereoscopic digital content comprises virtual images that are generated for viewing in a physical environment.

A computer-implemented method comprising: causing, by a computing device, display of stereoscopic digital content, the stereoscopic digital content including one or more left images rendered for a left eye of a viewer and one or more right images rendered for a right eye of the viewer; generating an alignment pattern within the stereoscopic digital content such that the alignment pattern is within a field of view of the viewer; detecting, with one or more cameras of the computing device, the alignment pattern in the one or more left images and the one or more right images of the stereoscopic digital content; and realigning the digital content by adjusting at least one of the one or more left or right images of the stereoscopic digital content based on the detected alignment patterns.

The computer-implemented method as described above, wherein the alignment pattern exploits one or more characteristics of a human vision system in order to avoid detection by the viewer.

The computer-implemented method as described above, wherein generating the alignment pattern comprises interleaving alignment patterns of opposite polarity within the digital content to cause the alignment pattern to be difficult to detect by the viewer.

The computer-implemented method as described above, wherein generating the alignment pattern comprises generating the alignment pattern using isoluminant colors to cause the alignment pattern to be difficult to detect by the viewer.

The computer-implemented method as described above, wherein generating the alignment pattern comprises generating the alignment pattern with a high spatial frequency to cause the alignment pattern to be difficult to detect by the viewer.

The computer-implemented method as described above, wherein generating the alignment pattern comprises generating the alignment pattern with angled markings to cause the alignment pattern to be difficult to detect by the viewer.

The computer-implemented method as described above, wherein the realigning the stereoscopic digital content further comprises: performing an image analysis of the one or more left and right images of the stereoscopic digital content to determine a phase difference between the one or more left and right images; and realigning the stereoscopic digital content by performing a correction, based on the phase difference, to bring the left and right images of the stereoscopic digital content back into alignment.

A head-mounted display device comprising: a stereoscopic display configured to cause display of stereoscopic digital content, the stereoscopic digital content including one or more left images for a left eye of a viewer and one or more right images for a right eye of the viewer; a first camera mounted on a left side of a housing of the head-mounted display device that is configured to detect an alignment pattern in one or more left images of the stereoscopic digital content, and a second camera mounted on a right side of a housing of the head-mounted display device that is configured to detect the alignment pattern in one or more right images of the stereoscopic digital content; and at least a memory and a processor to implement an alignment module configured to realign the stereoscopic digital content by adjusting at least one of the one or more left or right images of the stereoscopic digital content based on the alignment patterns detected by the first and second cameras.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A head-mounted display device comprising:
   a stereoscopic display configured to display stereoscopic digital content within the head-mounted display device in a field of view of a wearer of the head-mounted display device, the stereoscopic digital content including a left image for a left eye of the wearer and a right image for a right eye of the wearer;
   one or more cameras configured to detect an alignment pattern within the stereoscopic digital content displayed within the head-mounted display device on the stereoscopic display;
   a processor; and
   storage storing processor-executable instructions which, when executed by the processor, cause the processor to:
   determine an offset of the alignment pattern detected within the head-mounted display device by the one or more cameras, the offset reflecting a difference between the left image detected by the one or more cameras and the right image detected by the one or more cameras; and
   based at least in part on the offset, realign the stereoscopic digital content.

2. The head-mounted display device of claim 1, wherein the processor-executable instructions further cause the processor to:
   cause the alignment pattern to be displayed within the head-mounted display device on the stereoscopic display.

3. The head-mounted display device of claim 2, wherein the processor-executable instructions further cause the processor to:

cause the alignment pattern to be displayed using pixels of the stereoscopic display that are within the field of view of the wearer.

4. The head-mounted display device of claim 1, wherein the alignment pattern exploits one or more characteristics of a human vision system in order to avoid detection by the wearer.

5. The head-mounted display device of claim 1, wherein the processor-executable instructions further cause the processor to:
generate the alignment pattern by interleaving complementary patterns of opposite polarity within the digital content to cause the alignment pattern to be difficult to detect by the wearer.

6. The head-mounted display device of claim 1, wherein the processor-executable instructions further cause the processor to:
generate the alignment pattern using isoluminant colors to cause the alignment pattern to be difficult to detect by the wearer.

7. The head-mounted display device of claim 1, wherein the processor-executable instructions further cause the processor to:
generate the alignment pattern with a high spatial frequency to cause the alignment pattern to be difficult to detect by the wearer.

8. The head-mounted display device of claim 1, wherein the processor-executable instructions further cause the processor to:
generate the alignment pattern with angled markings to cause the alignment pattern to be difficult to detect by the wearer.

9. The head-mounted display device of claim 1, wherein the processor-executable instructions further cause the processor to:
perform an image analysis to determine an amount of the offset between the left image for the left eye and the right image for the right eye displayed within the head-mounted display device; and
realign the stereoscopic digital content by performing a correction on the stereoscopic digital content based at least in part on the amount of the offset.

10. The head-mounted display device of claim 1, wherein the one or more cameras include at least a left camera mounted on a left side of a housing of the head-mounted display device that is configured to capture the left image of the stereoscopic digital content, and a right camera mounted on a right side of the housing of the head-mounted display device that is configured to capture the right image of the stereoscopic digital content.

11. The head-mounted display device of claim 10, wherein the processor-executable instructions further cause the processor to:
determine the offset of the alignment pattern by comparing the left image captured by the left camera with the right image captured by the right camera.

12. The head-mounted display device of claim 1, wherein the processor-executable instructions further cause the processor to:
determine the offset of the alignment pattern by performing harmonic analysis and/or spatial analysis on the left image and the right image captured by the one or more cameras.

13. A computer-implemented method comprising:
causing display of stereoscopic digital content within a head-mounted display device, the stereoscopic digital content including a left image rendered for a left eye of a wearer of the head-mounted display device and a right image rendered for a right eye of the wearer;
generating an alignment pattern within the stereoscopic digital content such that the alignment pattern is within a field of view of the wearer;
detecting, with one or more cameras, the alignment pattern within the stereoscopic digital content displayed within the head-mounted display device;
determining an offset of the alignment pattern; and
realigning the stereoscopic digital content by adjusting at least one of the left image and the right image based at least in part on the offset of the detected alignment pattern.

14. The computer-implemented method of claim 13, wherein the alignment pattern exploits one or more characteristics of a human vision system in order to avoid detection by the wearer.

15. The computer-implemented method of claim 14, wherein the alignment pattern comprises complementary patterns of opposite polarity, isoluminant colors, a high spatial frequency, and/or angled markings that cause the alignment pattern to be difficult to detect by the wearer.

16. The computer-implemented method of claim 13, wherein the one or more cameras comprise a left camera for capturing the left image displayed within the head-mounted display device and a right camera for capturing the right image displayed within the head-mounted display device.

17. The computer-implemented method of claim 13, wherein the one or more cameras comprise a single camera, the method further comprising utilizing a prism with the single camera to capture the left image and the right image displayed within the head-mounted display device.

18. The computer-implemented method of claim 13, wherein the determining the offset of the alignment pattern further comprises determining a difference in the alignment pattern between the left image and the right image displayed within the head-mounted display device.

19. The computer-implemented method of claim 13, wherein the determining the offset of the alignment pattern further comprises determining a difference between an instance of the alignment pattern within the left image and another instance of the alignment pattern within the right image.

20. A head-mounted display device comprising:
a stereoscopic display configured to display stereoscopic digital content, the stereoscopic digital content including left images for a left eye of a wearer of the head-mounted display device and right images for a right eye of the wearer;
one or more cameras mounted on a housing of the head-mounted display device, the one or more cameras being configured to detect an alignment pattern in the left images and the right images of the stereoscopic digital content displayed within the head-mounted display device;
a processor, and
storage storing processor-executable instructions which, when executed by the processor, cause the processor to:
realign the stereoscopic digital content based at least in part on an offset of the the alignment pattern detected within the head-mounted display device by the one or more cameras.

* * * * *